United States Patent [19]
Takimoto et al.

[11] Patent Number: 6,095,557
[45] Date of Patent: Aug. 1, 2000

[54] AIR BAG APPARATUS

[75] Inventors: Masahiro Takimoto, Inabe-gun; Kouji Shiraki, Motosu-gun; Hisaaki Kato, Anjyo; Yuji Kuriyama, Seki; Mamoru Tomida; Yasumasa Tatewaki, both of Ichinomiya; Tatsuo Hirano, Komaki, all of Japan

[73] Assignee: Toyoda Gosei Co., Ltd., Aichi, Japan

[21] Appl. No.: 09/131,504

[22] Filed: Aug. 10, 1998

[30] Foreign Application Priority Data

Aug. 8, 1997 [JP] Japan ................................. 9-214981
Jun. 12, 1998 [JP] Japan ................................ 10-164893

[51] Int. Cl.⁷ .................................................. B60R 21/28
[52] U.S. Cl. .................... 280/739; 280/743.1; 280/743.2
[58] Field of Search ..................................... 280/738, 739, 280/743.2, 743, 1

[56] References Cited

U.S. PATENT DOCUMENTS 5,246,250  9/1993  Wolanin et al. ......................... 280/739
5,280,953  1/1994  Wolanin et al. ......................... 280/739
5,405,166  4/1995  Rogerson ................................ 280/739

FOREIGN PATENT DOCUMENTS

52-47233  4/1977  Japan ..................................... 280/739

Primary Examiner—Eric Culbreth
Attorney, Agent, or Firm—Pillsbury Madison & Sutro

[57] ABSTRACT

An air bag apparatus to be mounted in a vehicle in order to protect an on-board passenger by unfolding and inflating a bag body when the bag body is activated. The air bag apparatus is equipped with an inflator, the bag body which is mounted in folded-up condition in such a way that the gas emitted from the inflator can flow into the bag body and equipped with gas vent holes, and a cover body for covering the bag body in the folded-up condition. Each gas vent hole is fitted with a gas-vent quantity regulating valve capable of decreasing the open quantity of the gas-vent hole during the time the bag body is inflating.

12 Claims, 7 Drawing Sheets

AIR BAG APPARATUS

BACKGROUND OF THE INVENTION

1. Field of the Invention

The present invention relates to an air bag apparatus mounted in a vehicle in order to protect a on-board passenger by activating a bag body to be unfolded and inflated in the direction of the on-board passenger. More particularly, the present invention relates to an air bag apparatus fit for use as what is intended for a passenger seat or a steering wheel of an automobile.

Although a description will subsequently be given of an air bag apparatus which is mounted in an instrument panel and intended for a passenger seat by way of example, the present invention is also applicable to an air bag apparatus for any other outfit such as a steering wheel and a rear seat as long as the air bag apparatus is similar in construction.

2. Description of the Related Art

Figure 1:
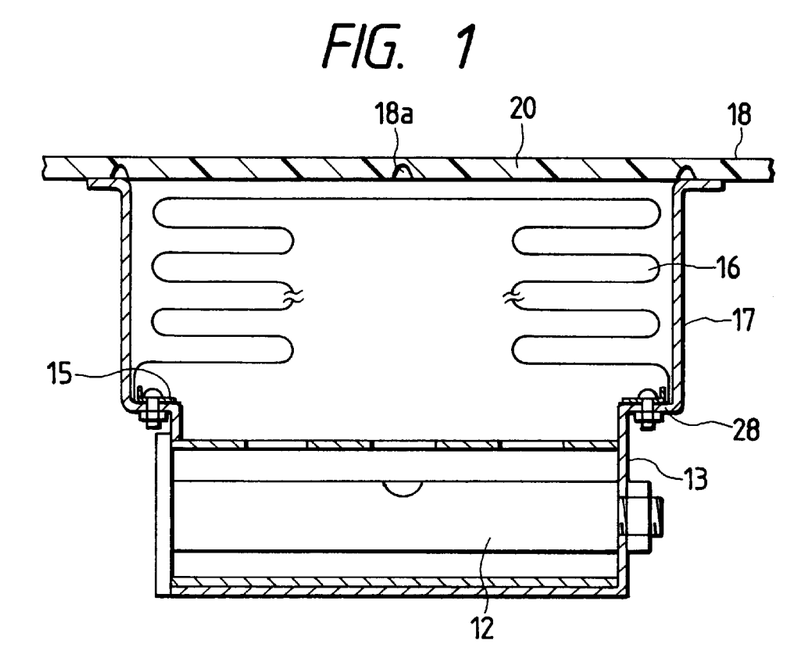
FIG. 1 is a schematic sectional view showing an example of an air bag apparatus to which the present invention is applied.
Figure 2:
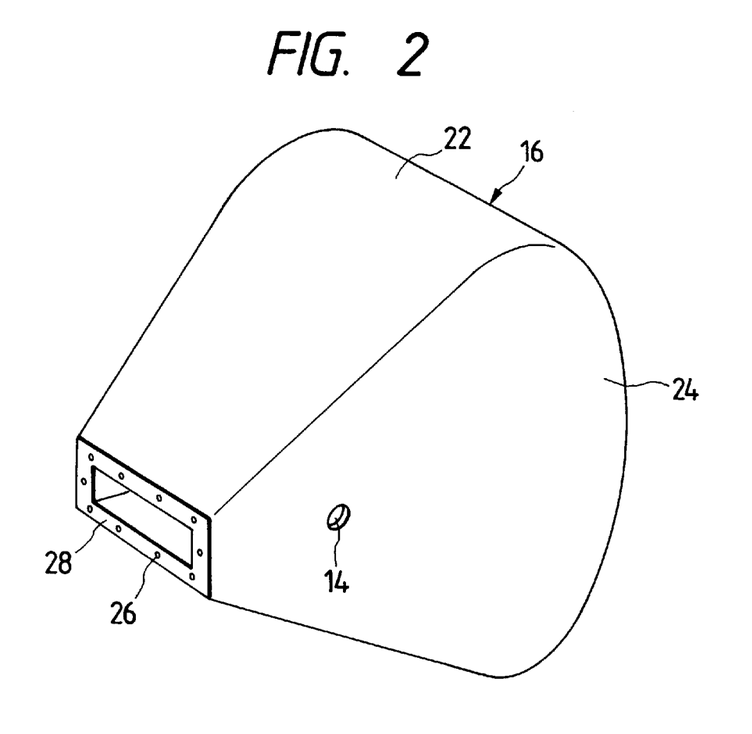
FIG. 2 is a perspective view showing an example of an air bag for use in the air bag apparatus according to the present invention.

An air bag apparatus for a passenger seat generally comprises an inflator 12, a bag body 16 having gas vent holes 14 in such a folded-up condition that the gas emitted from the inflator 12 can flow into the bag body, and a cover body 18 for covering the bag body 16 in that folded-up condition. The cover body 18 is basically equipped with a hinge door portion (a casement door as illustrated) 20 which is opened when the bag body is initially unfolded and inflated (see FIGS. 1, 2). The bag body 16 is, as shown in FIG. 2, formed by sewing one sheet of strip-cloth-like main panel 22 and two sheets of planar eggplant-shaped side panels 24 and provided with a bag-mounting base portion 28 having bolt fitting holes 26 on the root portion side of the bag body. Reference numeral 13 in FIG. 1 denote a defuser can; 15, a bag retainer; and 17, a bag housing can.

Figure 3:
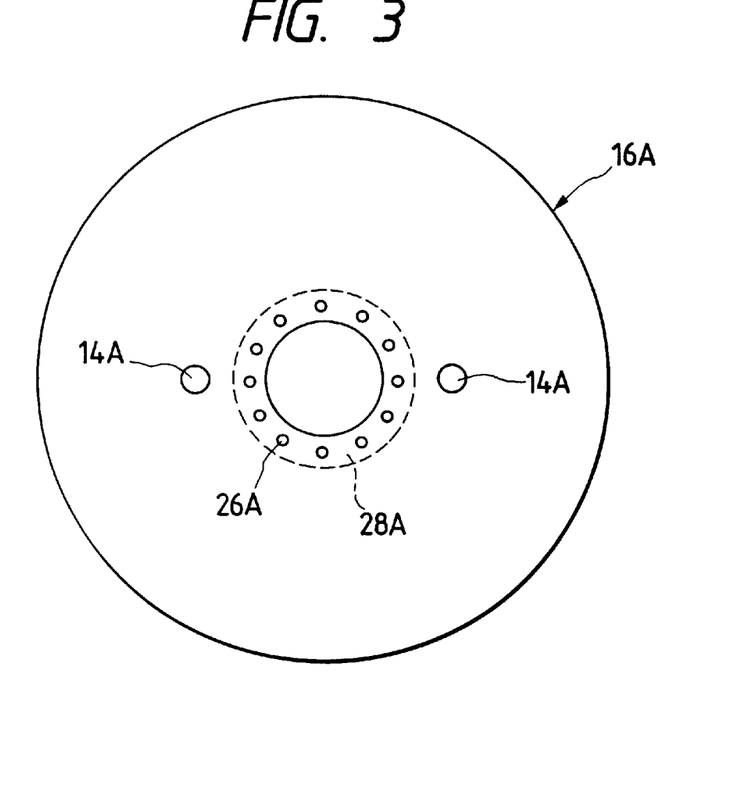
FIG. 3 is a plan view showing another example of an air bag for use therein.

As shown in FIG. 3, the bag body 16 may be a planar circle 16A in shape. In FIG. 3, reference numeral 14A denotes gas vent holes; 26A, bolt fitting holes; and 28A, a bag-mounting base portion.

The following four steps are followed when an air bag is activated.

First step: The inflator is ignited and the gas discharged from the inflator flows into the bag body. At this time, the bag body tries to become unfolded and inflated but the presence of the cover body on the front side in the inflating direction causes the unfolding and inflation of the bag body to be temporarily suppressed. Accordingly, the gas pressure in the bag body is sharply increased and there develops the force of thrusting up the cover body from the rear side (inside).

Second step: When the force of thrusting up the cover body from the inside exceeds a predetermined value, the hinge door portion is opened as a groove portion formed in the cover body is ruptured, and the bag body pops out of the cover body at high velocity. This is because the quantity of gas flowing into the bag body from the inflator reaches a peak with the absence of an obstacle for preventing the bag body from inflating.

Third step: After completion of the unfolding and inflation of the bag body, the quantity of gas flowing from the inflator exceeds the peak and enters a reducing stage. At this stage, the bag body comes into contact with the on-board passenger.

Fourth step: While pressing against the bag body out of inertia force, the on-board passenger receives counterforce, that is, deceleration (G) from the bag body. As the gas flows out of the vent holes, texture, seams and the like when the on-board passenger thus presses against the bag body, the deceleration received by the on-board passenger is lowered, whereupon the on-board passenger is restrained (protected).

It is desirable to suppress the inflation speed of the bag body toward the on-board passenger at the (second) stage at which the bag body pops out of the cover body at the aforesaid second stage.

Although it is considered possible to reduce the quantity of gas flowing into the bag body from the inflator in order to suppress the inflation speed, the time required to substantially complete the inflation of the bag body which is brought into contact with and used to protect the on-board passenger is also prolonged by a large margin and this is also undesirable.

SUMMARY OF THE INVENTION

In view of the foregoing problems, an object of the present invention is to provide an air bag apparatus capable of suppressing the inflation speed of a bag body toward an on-board passenger at a second stage at which the bag body pops out of a cover body without making longer the time required until the inflation of the bag body is substantially completed.

Another object of the present invention intended to accomplish the object above is to provide an air bag apparatus capable of utilizing an allowable stroke in a passenger compartment as effectively as possible and also suppressing the peak deceleration value without a sharp increase in the deceleration received by an on-board passenger from an air bag.

To solve the foregoing problems there is provided an air bag apparatus to be mounted in a vehicle in order to protect an on-board passenger by unfolding and inflating a bag body when the bag body is activated, the air bag apparatus comprising: an inflator for discharging a gas; a bag body mounted in folded-up condition so that the gas discharged from the inflator can flow into the bag body, the bag body having a gas vent hole; a cover body for covering the bag body with the folded-up condition; and a gas-vent quantity regulating valve fitted on the gas vent hole so as to decrease an open quantity of the gas vent hole during a time the bag body is inflating.

In the above air bag apparatus, a plurality of gas vent holes and corresponding gas-vent quantity regulating valves may be provided in the bag body, and the gas-vent quantity regulating valves are preferably formed of straps which are secured to an inside of the bag body so that a full-open state of said gas-vent holes are maintained with temporal tacking means of which temporal tacking force is set so as to be released by a stretching force of base fabric of the bag body during the time the bag body is inflating.

Further, in the aforementioned air bag apparatus, the relation between the width of the strap of the gas-vent quantity regulating valves and the diameter of the gas vent holes is set so that when the internal pressure of the bag body is increased by an on-board passenger who has pressed against an air bag, a gas-vent throttle passage may be formed as a result of the forcible squeezing of the strap of the gas-vent quantity regulating valves into the respective gas vent holes.

DETAILED DESCRIPTION OF THE PREFERRED EMBODIMENTS

Referring to the drawings, there is given a description of an embodiment of the present invention.

An air bag apparatus embodying the present invention generally comprises an inflator 12, a bag body 16 having gas vent holes 14 in such a folded-up condition that the gas discharged from the inflator 12 can flow into the bag body, and a cover body 18 for covering the bag body 16 in that folded-up condition. The cover body 18 is basically equipped with a hinge door portion 20 which is opened when the bag body is initially unfolded and inflated (see FIGS. 1, 2).

Figure 4:
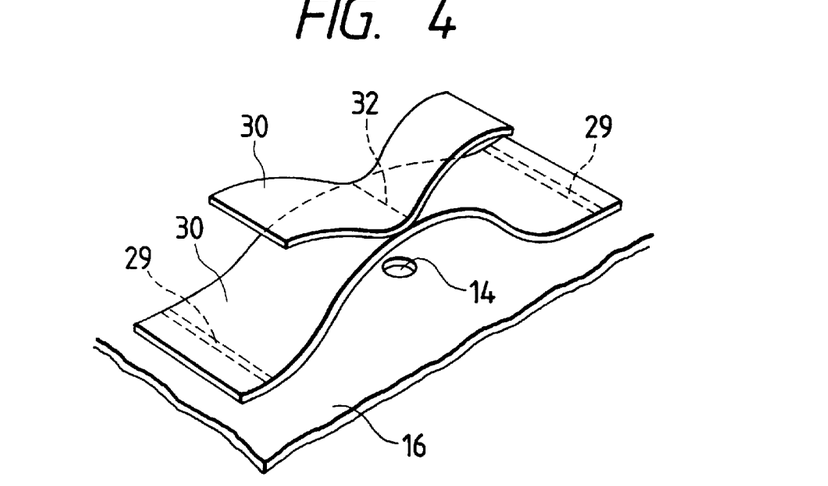
FIG. 4 is a partial perspective view showing regions where gas-vent quantity regulating pieces embodying the present invention are mounted.
Figure 5:
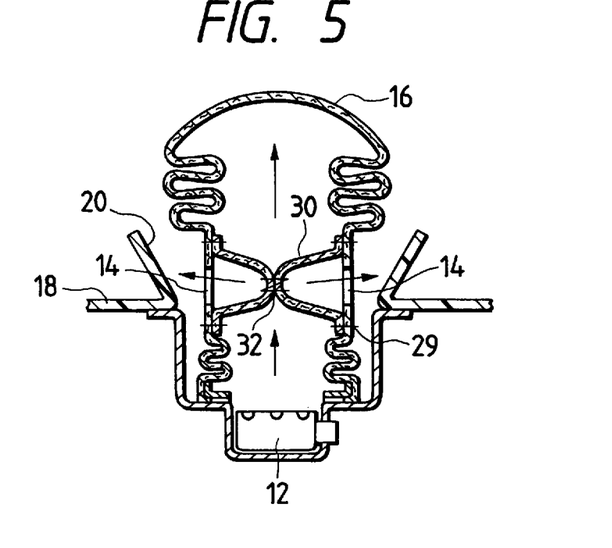
FIG. 5 is a model sectional view in the first half of a second stage when the operation of an air bag apparatus embodying the present invention is performed.
Figure 6:
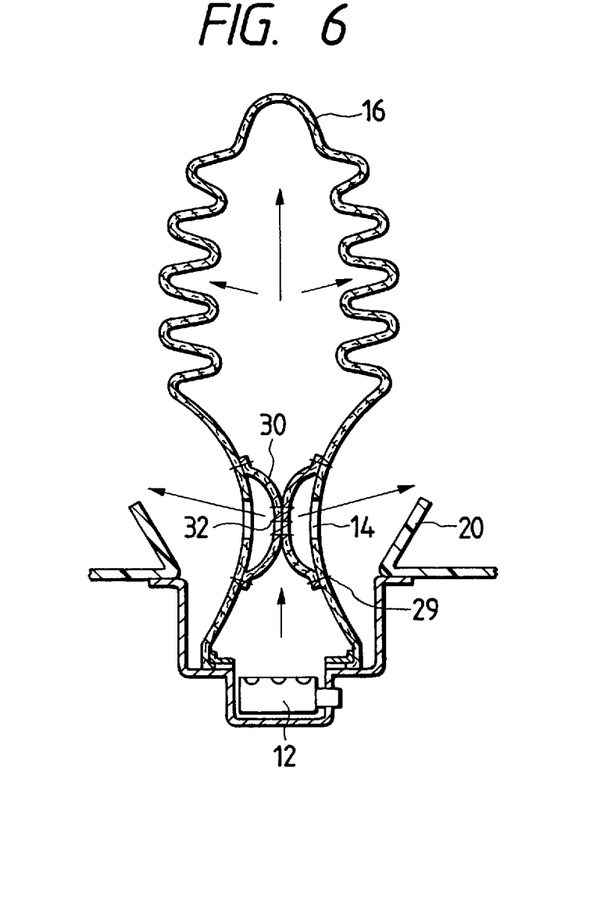
FIG. 6 is a model sectional view in the second half of the second stage according to the present invention.

With the aforesaid arrangement, each gas vent hole 14 is fitted with a gas-vent quantity regulating valve capable of decreasing the open quantity of the gas-vent hole 14 during the time the bag body 16 is inflating (see FIGS. 4–6).

As illustrated in the drawings, the gas-vent quantity regulating valves are formed of gas-vent quantity regulating pieces 30 in the form of straps which are secured to the inside of the bag body 16 so that the full-open positions of the gas-vent holes are maintained with temporal tacking means 32 whose temporal tacking force is set so as to be released by the stretching force of base fabric of the bag during the time the bag body 16 is inflating.

The gas-vent quantity regulating pieces 30 may be made of any material as long as the material is unaffected, that is, not damaged nor deformed by heat. The gas-vent quantity regulating pieces 30 are normally formed of the same base fabric as what is used to form the bag body 16 and coated with rubber, if necessary, and may also be formed of a flexible plastic sheet or the like. The mode of securing the gas-vent quantity regulating pieces 30 is such that if these pieces are made of cloth, they are fitted together by sewing and, if they are plastic sheets or the like, they may be adhesion-bonded.

Figure 10:
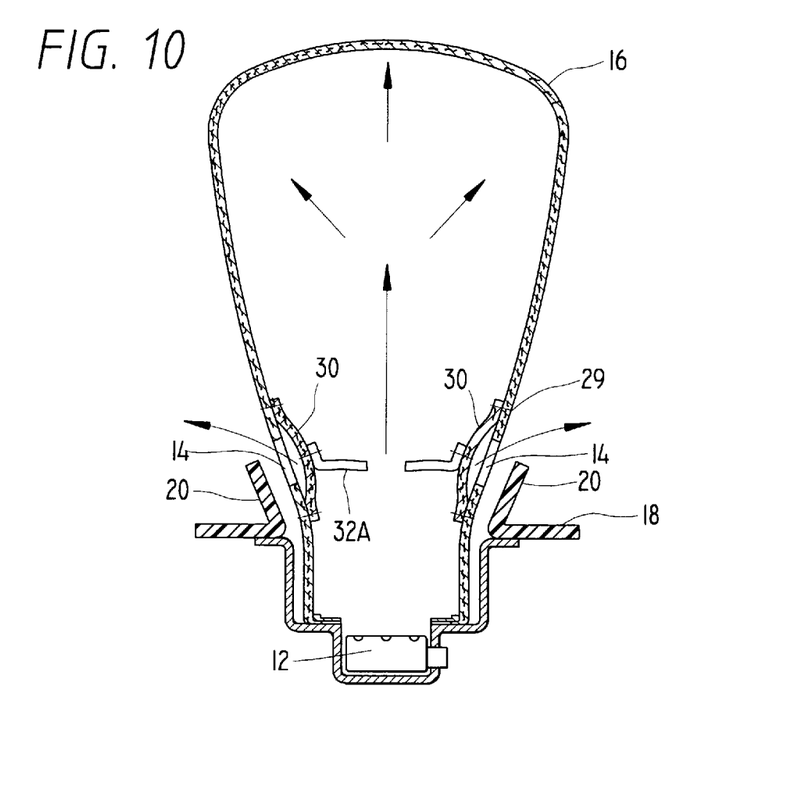
FIG. 10 is a model sectional view immediately before a third stage in another embodiment of the present invention.

The temporal tacking means 32 is not particularly restricted and when the gas-vent quantity regulating pieces 30 are made of cloth or the like, the pair of gas-vent quantity regulating pieces 30, 30 are put together by temporary sewing (see FIGS. 4, 5) or otherwise the central portions of the gas-vent quantity regulating pieces 30, 30 are put close to each other with a flexible wire 32A which is cut off by the weak force of temporary sewing thread as shown in FIG. 10. When the gas-vent quantity regulating pieces 30 are plastic straps, further, they may be partially fusion-bonded.

Given that the temporal tacking force of (releasing) the temporal tacking means 32 is 10–100N, for example, the temporal tacking means at this time is not released by a predetermined set pressure but released during the course of a change in the shape of the bag body (the base fabric of the bag), whereby the control of the temporal tacking means 32 is easy in comparison with the use of set pressure.

The forms of the gas-vent quantity regulating pieces 30 are, as illustrated in the drawings, preferably disposed so that the gas flow is stopped at the time of temporal tacking the gas-vent quantity regulating pieces 30, 30, that is, the gas-vent quantity regulating pieces 30 are set substantially perpendicular to the direction in which the gas is jetted out. This is because the inflation speed of the bag body toward the on-board passenger is suppressed as the gas flow is blocked.

Figure 11:
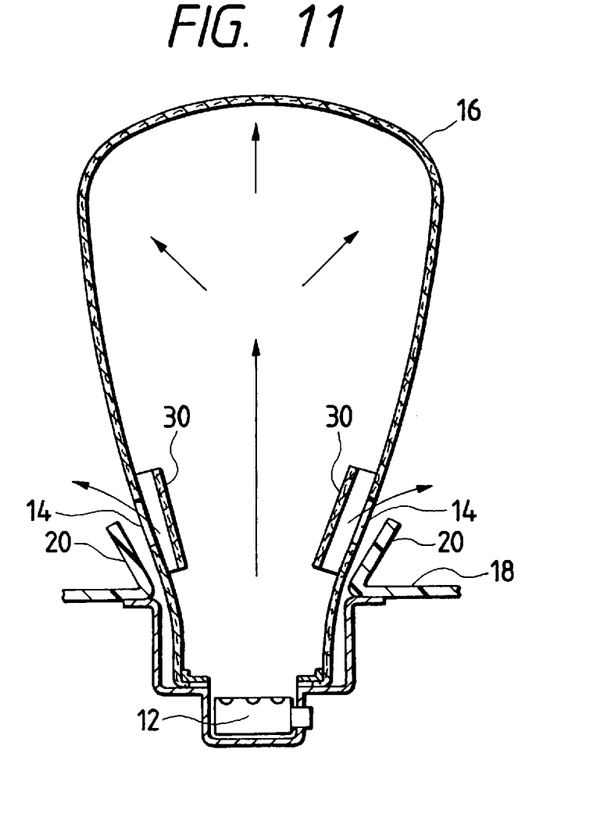
FIG. 11 is a model sectional view immediately before a third stage in still another embodiment of the present invention.

As shown in FIG. 11, the gas-vent quantity regulating pieces 30 may be disposed so that they form faces substantially parallel to the direction in which the gas is jetted out.

Although the gas-vent quantity regulating pieces 30 are solid, as illustrated in the drawings, the gas vent holes 14 may be formed with gas-vent throttle holes that can be superposed on the respective gas vent holes 14, so that the gas-vent quantity regulating pieces 30 may be also provided with gas vent holes which overlap gas vent holes 14 so as to release the trapped air even when the gas vent holes 14 are closed.

Figure 13A:
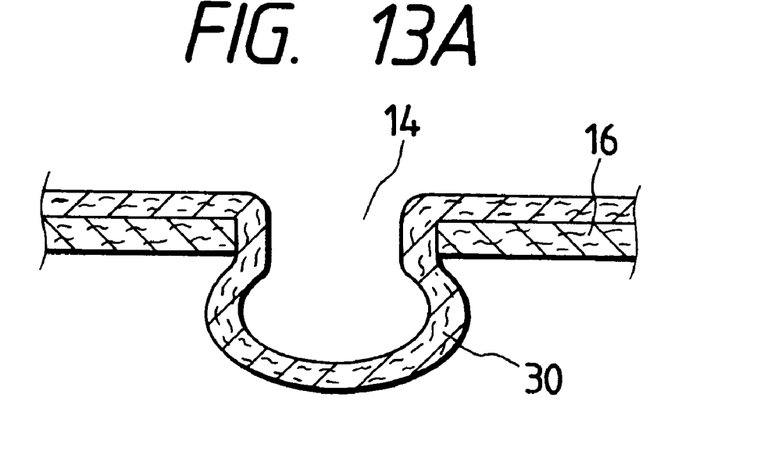
FIG. 13A is a vertical and transverse sectional view showing the relation between gas vent holes and gas-vent quantity regulating pieces at a fourth stage in another embodiment of the invention.
Figure 13B:
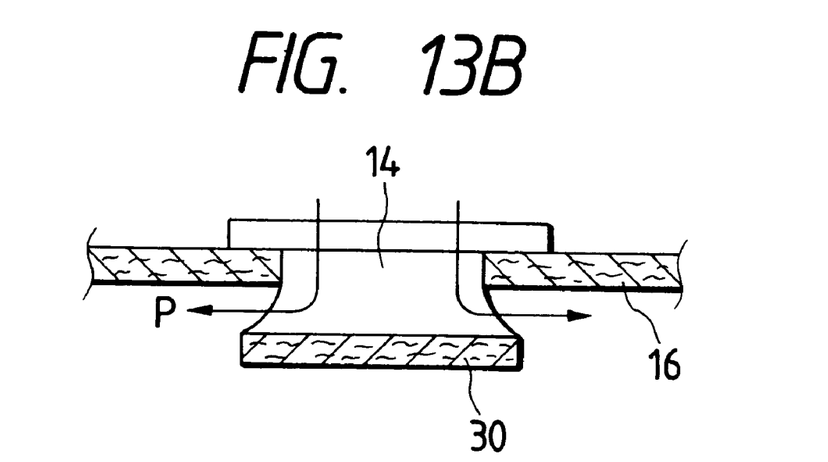
FIG. 13B is a cross sectional view of FIG. 13A.

It is also desirable that instead of forming the gas-vent throttle holes, the relation between the diameter of the gas vent holes 14 and the width of the gas-vent quantity regulating pieces 30 is set so that, at the fourth stage of actuating the air bag, each gas-vent quantity regulating piece 30 is caused by the on-board passenger who has pressed against the air bag to partially protrude outside the gas vent hole 14 as shown in FIGS. 13A and 13B in order to form a gas-vent throttle passage P because the rate of increasing the deceleration (G) received by the on-board passenger is uniformized with the effect of suppressing its peak value.

A description will subsequently be given of a mode for using the aforesaid air bag apparatus.

The air bag apparatus is mounted in an air bag mount portion of an instrument panel in a known method and the instrument panel is mounted in a vehicle body.

When an impact load exceeding a predetermined value is applied to the vehicle, on receiving a detection signal from an impact sensor (not shown) the inflator 12 operates and the air bag apparatus follows the aforesaid four steps.

Since the gas-vent quantity regulating pieces 30 in the air bag apparatus according to the present invention have the gas vent holes 14 to be substantially closed just before the fourth step (at which the bag body restrains and protects the on-board passenger), the quantity of gas discharged from the inflator 12 can be set smaller than that in the case where the gas-vent quantity regulating pieces 30 are not provided and the inflation is substantially completed, when the substantially same time (not too much longer) is set in both cases.

First step: The inflator 12 is ignited and the gas discharged from the inflator 12 flows into the bag body 16. At this time, the bag body tries to become unfolded and inflated but the presence of the cover body 18 on the front side in the inflating direction causes the unfolding and inflation of the bag body to be temporarily suppressed. Accordingly, the gas pressure in the bag body 16 is sharply increased and there develops the force of thrusting up the cover body 18 from the rear side (inside).

Second step: When the force of thrusting up the cover body 18 from the inside exceeds a predetermined value, the hinge door portion 20 is opened as a rupture groove portion 18a formed in the cover body 18 is ruptured, and the bag body 16 pops out of the cover body 18 as shown in FIGS. 5 and 6. At this stage, with the absence of an obstacle for preventing the bag body 16 from inflating, the bag body 16 is suddenly unfolded (release of the folded-up condition) and the quantity of gas discharged from the inflator 12 reaches a peak and besides the quantity of gas flowing into the bag body 16 is maximized. However, the gas is drawn out of the gas vent holes 14 from the full-open condition and since the quantity of gas (inflow quantity) discharged from the inflator 12 is set smaller than that with the absence of the gas-vent quantity regulating pieces 30, the inflation speed of the bag body 16 toward the on-board passenger is suppressed.

Figure 7:
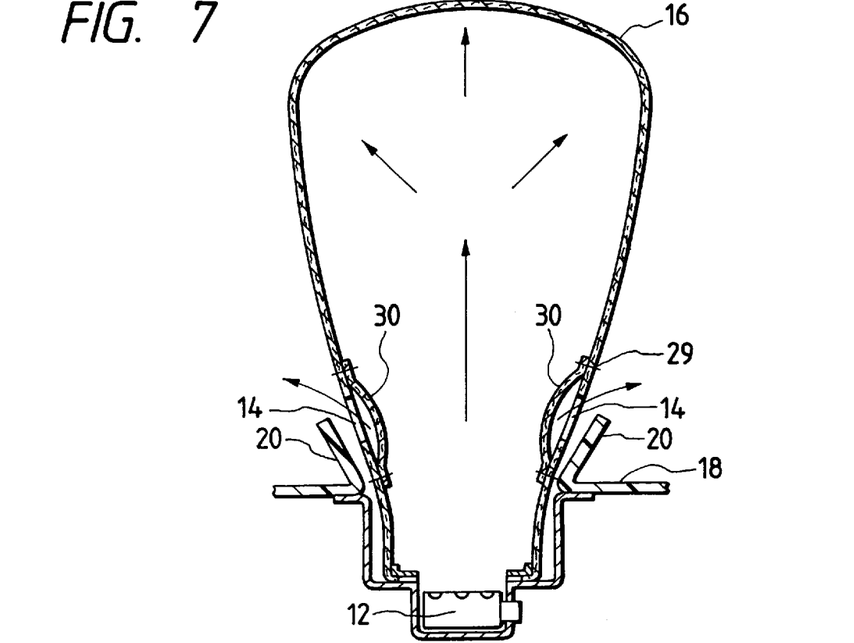
FIG. 7 is a model sectional view immediately before a third stage (completion of inflation of the bag body) according to the present invention.

The temporary sewing thread 32 as a temporal tacking means is broken due to the stretching force of the bag, immediately before a third stage is taken, that is, during the time the bag body 16 is inflating (see FIG. 7).

Figure 8:
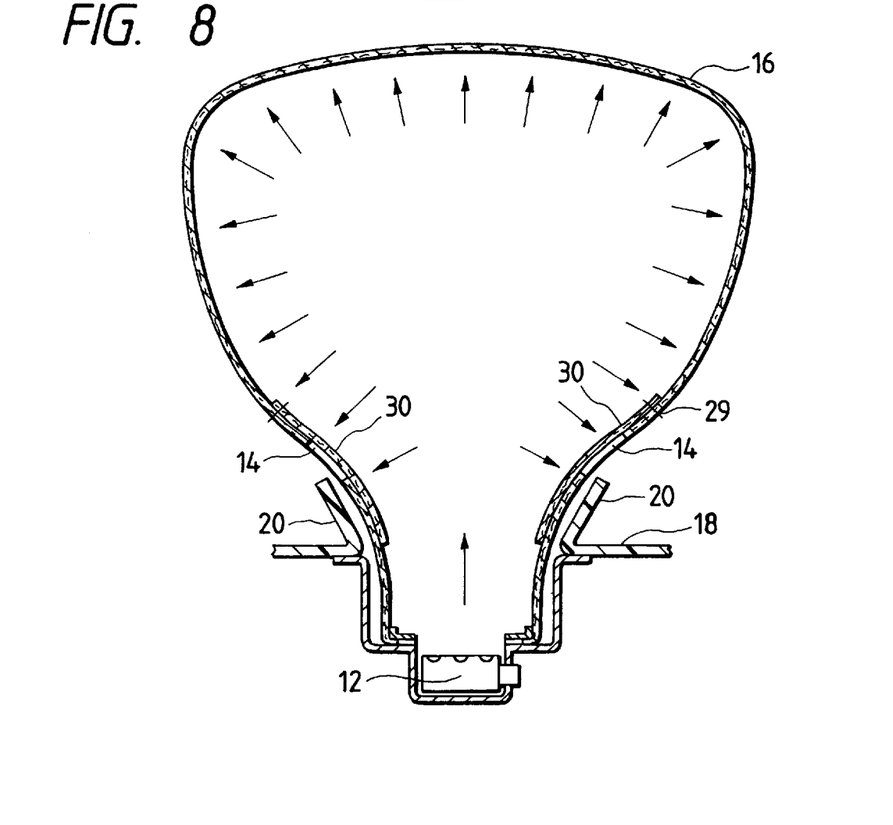
FIG. 8 is a model sectional view at the third stage according to the present invention.

Third step: After substantial completion of the unfolding and inflation of the bag body 16, the quantity of gas flowing from the inflator 12 exceeds the peak and enters a reducing stage. Since the temporal tacking means is released immediately before this stage, the gas-vent quantity regulating pieces 30 work to substantially close the gas vent holes 14 (see FIG. 8). Consequently, even though the set quantity of gas is smaller than that of the conventional one, the time required to make the bag body 16 large enough to contact and protect (restrain) the on-board passenger (to inflate the bag body 16 completely) remains unchanged. Then the bag body is caused to have a suitable size, whereas the balance between the quantity of inflow gas and that of outflow gas is uniformized and stabilized. At this stage, the bag body 16 is brought into contact with the on-board passenger who is moving forward out of inertia. In other words, the inflated bag body 16 is caused to lie between the on-board passenger and passenger compartment equipment (window shield, instrument panel).

Fourth step: Since the on-board passenger in contact with the bag body 16 has forward inertia, the on-board passenger acts so as to press against the bag body 16 and receives the deceleration (G).

Figure 9:
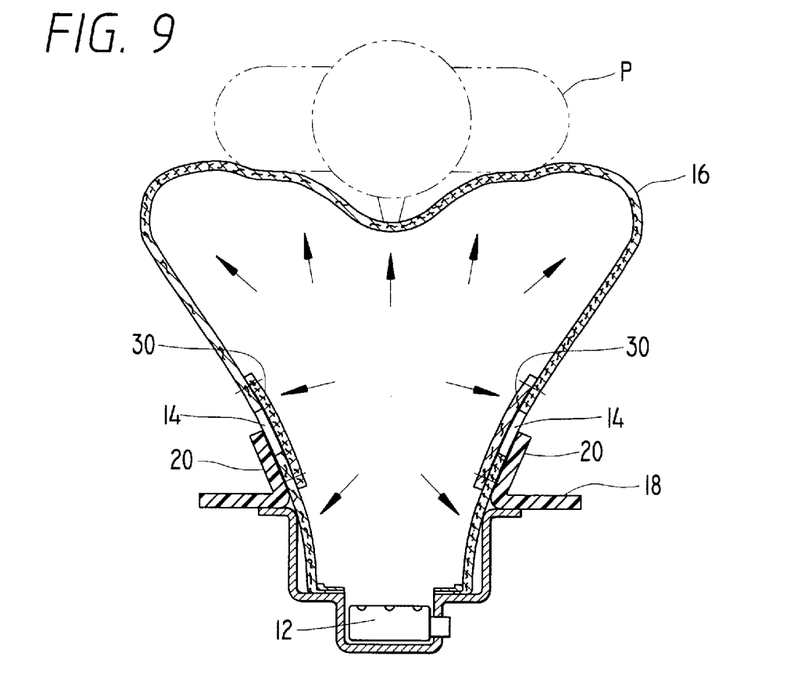
FIG. 9 is a model sectional view at a fourth stage according to the present invention.

If the width of the gas-vent quantity regulating pieces 30 is considerably greater than the diameter of the gas vent holes 14, a completely closed state is maintained (see FIG. 9).

At this time, gas leaks out of only the base fabric seams/stitches of bag body 16 and the boundary between the gas-vent quantity regulating pieces 30 and the bag body 16, so that a marginal quantity of gas leakage is small. On the other hand, the initial velocity at which the on-board passenger presses against the bag body 16 is high.

Consequently, the rate of increasing the internal pressure of the bag body 16 becomes raised halfway and so does the rate of increasing the deceleration (G) received by the on-board passenger.

Figure 12:
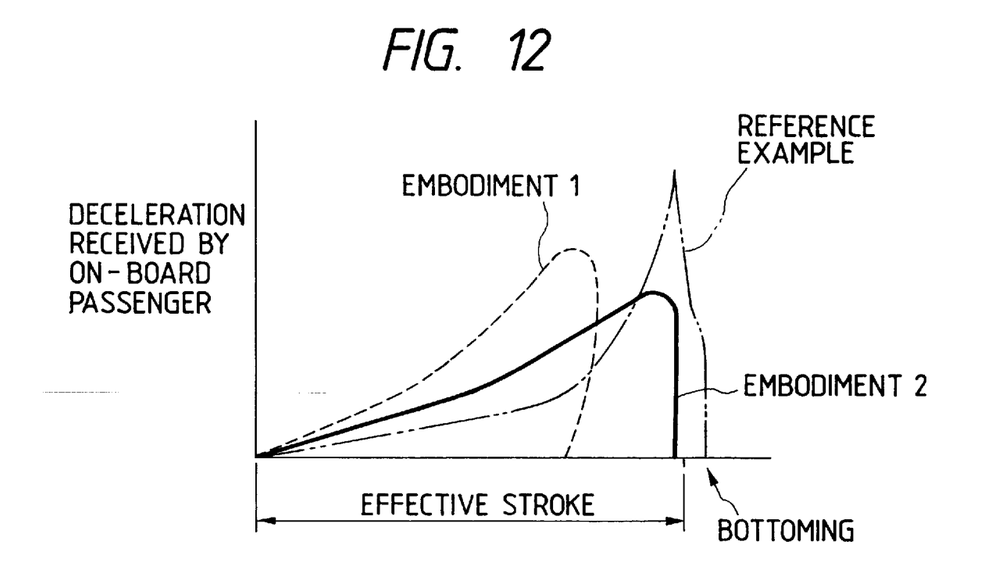
FIG. 12 is a graph showing the relation between movement strokes of on-board passengers and deceleration received by the on-board passengers in an embodiment of the invention and a conventional example.

Therefore, a rebound is produced between the on-board passenger and the counterforce face (restrictive face) of the bag body after the deceleration reaches the peak value and the forward movement of the on-board passenger is stopped in the mid position of the allowable stroke in the passenger compartment (see a dashed line of FIG. 12).

In this case, the allowable stroke in the passenger compartment means a distance up to the time immediately before the on-board passenger interferes with passenger compartment equipment (window shield, instrument panel) after the on-board passenger is brought into contact with the bag body that has completely been inflated. Further, the bottom-out means the bottoming of pressing against the bag body on the part of the on-board passenger.

The exemplary specification of such a gas-vent quantity regulating piece as to maintain the completely closed state of the gas vent hole is as follows:

In the case of a dumbbell-shaped gas-vent quantity regulating piece 30 as shown in FIG. 4, for example, the maximum width of the gas-vent quantity regulating piece 30 (width of the fixed facing region) is assumed to be 180 mm; the minimum width thereof (width of a region where the temporal tacking means 32 is formed), 160 mm; and the length thereof, 190 mm when the gas vent hole 14 is 6.0 mm$_\phi$ in diameter.

In the case of a oblong gas-vent quantity regulating piece 30, the specification defined in embodiment 1 of Table 1 is to be applied thereto.

If the width of the gas-vent quantity regulating piece 30 is not so great in comparison with the diameter of the gas vent hole 14, on the other hand, a gas-vent throttle passage P is formed as a result of the forcible squeezing of the gas-vent quantity regulating piece into the gas vent hole as the internal pressure increases as shown in FIG. 13A and FIG. 13B. Consequently, the gas is allowed to flow out of the bag body 16 adequately to the extent that the deceleration is not sharply increased. As shown by a solid line of FIG. 12, the rate of increasing the deceleration (G) received by the on-board passenger is uniformized and the on-board passenger keeps pressing against the bag body 16 and is then stopped after the on-board passenger is moved by substantially the whole allowable stroke. In other words, while decreasing its volume, the bag body 16 disperses the deceleration acting on the on-board passenger and softly restrains the on-board passenger ultimately without increasing the peak value of the deceleration.

In the case of the gas-vent quantity regulating piece 30 together with the formation of the gas-vent throttle passage P, the specification defined in embodiment 2 of Table 1 is applied thereto when it is an oblong one.

The techniques of controlling inflators in a multistage mode as described in Japanese Patent Publication No. Hei. 8-502709 and Hei. 4-342639 maybe employed simultaneously according to the present invention.

If in the air bag apparatus according to the present invention, each gas vent hole is fitted with the gas-vent quantity regulating valve capable of decreasing the open quantity of the gas-vent hole during the time the bag body is inflating, the following functions and effect are demonstrated.

The presence of the gas-vent quantity regulating valves makes it possible to decrease the quantity of gas vent during the time the bag body is inflating. The set quantity of gas flowing into the bag body from the inflator can be set smaller than that in the case where the gas-vent quantity regulating valves are not provided and the inflation of the bag body is substantially completed, when the substantially same time is set in both cases.

Therefore, the speed of the bag body immediately after the bag body pops out of the cover body (second stage) toward the on-board passenger can be suppressed relatively.

The gas-vent quantity regulating valves are formed of the gas-vent quantity regulating pieces in the form of straps which are secured to the inside of the bag body so that the full-open state of the gas-vent holes are maintained with the temporal tacking means whose temporal tacking force is set so as to be released by the stretching force of the bag during the time the bag body is inflating. The temporal tacking means at this time is not released by the predetermined set pressure but released during the course of a change in the shape of the bag body (the base fabric of the bag), whereby the control of the temporal tacking means is easy.

When a gas-vent throttle passage is formed as a result of the forcible squeezing of the gas-vent quantity regulating piece into the gas vent hole as the internal pressure increases without making the width of the gas-vent quantity regulating piece 30 relatively greater than the diameter of the gas vent hole, the allowable stroke in the passenger compartment is effectively utilizable with respect to the moving distance of the on-board passenger, whereby the rate of increasing the deceleration received by the on-board passenger is uniformized with the effect of keeping its peak value lower.

A description will subsequently be given of a working example carried out to make certain of the effect of the invention.

Air bag apparatus (inflator output: 400 kPa, air bag volume: 110L) incorporating bag bodies with gas vent holes having diameters listed in Table 1 and gas-vent quantity regulating pieces having widths and lengths also listed in Table 1 were used as specimens in a simulation of actual vehicle collision under the following test condition: speed 30 mph thread (frontal clash); dummy used, Hybrid III AM50; and allowable stroke, 550 mm.

The valve conditions and the strokes at the aforesaid fourth stage and strokes were as shown in Table 1. The relation between the deceleration (G) received by the on-board passenger and the movement stroke inside the passenger compartment resulted in those shown in FIG. 12. As shown in embodiment 1, it is obvious that the effective stroke is not sufficiently utilizable when the width of the gas-vent quantity regulating pieces is set greater. On the contrary, as shown in embodiment 2, it is also obvious that the on-board passenger is made restrainable more softly by the air bag when the width of the gas-vent quantity regulating pieces is narrowed. As shown in Reference Example, an increase in the internal pressure caused by the on-board passenger who has pressed against the air bag is imperceptible when the gas vent holes are too large and kept open at all times and bottoming is seen to occur.

TABLE 1

| | Gas vent hole: dia (mm) | Gas-vent quantity regulating piece: | | Valve condition: | Stroke: (mm) |
| | | width (mm) | length (mm) | | |
| --- | --- | --- | --- | --- | --- |
| Embodiment 1 | 60 | 160 | 190 | almost kept closed | 530 |
| Embodiment 2 | 60 | 120 | 190 | half open | 550 |
| Reference Example | 60 | — | — | completely open | 560* |

*: bottoming

What is claimed is:

1. An air bag apparatus comprising:
    an inflator for discharging gas;
    a bag body mounted in folded-up condition so that the gas discharged from said inflator can flow into said bag body;
    a cover body for covering said bag body in the folded-up condition;
    wherein said bag body comprises at least one gas vent hole;
    at least one strap, secured to an inside of said bag body on at least two sides of said at least one gas vent hole;
    means for temporal tacking which is attached to said at least one strap;
    wherein said at least one strap is used to decrease an open quantity of said at least one gas vent hole during a time said bag body is inflating; and
    wherein said means for temporal tacking, at a time during inflation of said bag body, applies a force on said at least one strap in a direction opposite said gas vent hole.

2. The air bag apparatus according to claim 1, wherein said bag body comprises at least two straps.

3. The air bag apparatus according to claim 1, wherein said means for temporal tacking is medially attached to said at least one strap.

4. The air bag apparatus according to claim 1, wherein said means for temporal tacking is released by a stretching force of said bag body during inflation.

5. The air bag apparatus according to claim 1, wherein a relation between a width of said at least one strap and a diameter of said at least one gas vent hole is set so that when an internal pressure of said bag body is increased by the on-board passenger who has pressed against the air bag, a gas-vent throttle passage may be formed as a result of a forcible squeezing of said at least one strap into said at least one gas vent hole.

6. An air bag to be inflated by a gas discharged from an inflator, comprising:
    a bag body;
    at least one gas vent hole;
    at least one strap secured to an inside of said bag body on at least two sides of said at least one gas vent hole;
    means for temporal tacking attached to said at least one strap;
    wherein said at least one strap is used to decrease an open quantity of said at least one gas vent hole during inflation of said bag body; and
    wherein said means for temporal tacking, at a time during inflation of said bag body, applies a force on said at least one strap in a direction opposite said gas vent hole.

7. The air bag apparatus according to claim 6, wherein a relation between a width of said at least one strap and a diameter of said at least one gas vent hole is set so that when an internal pressure of said bag body is increased by the on-board passenger who has pressed against the air bag, a gas-vent throttle passage may be formed as a result of a forcible squeezing of said at least one strap into said at least one gas vent hole.

8. The air bag according to claim 6, comprising at least two straps.

9. The air bag according to claim 6, wherein said means for temporal tacking is medially attached to said at least one strap.

10. The air bag according to claim 6, wherein said means for temporal tacking is released by a stretching force of said bag body during the time said bag body is inflating.

11. An air bag to be inflated by a gas discharged from an inflator, comprising:

- a bag body;
- at least one gas vent hole;
- at least two straps, at least one of which is secured to an inside of said bag body on at least two sides of a gas vent hole;
- a temporal sewing to put at least two of said at least two straps together, wherein at least one of said straps is used to decrease an open quantity of said at least one gas vent hole during inflation of said bag body.

12. An air bag to be inflated by a gas discharged from an inflator, comprising:

- a bag body;
- at least one gas vent hole;
- at least two straps, at least one of which is secured to an inside of said bag body on at least two sides of a gas vent hole;
- means for temporal tacking comprising a flexible wire to put at least two of said at least two straps close to each other; and wherein at least one of said at least two straps is used to decrease an open quantity of said at least one gas vent hole during inflation of said bag body.

* * * * *